United States Patent
Turner et al.

(10) Patent No.: US 9,702,726 B2
(45) Date of Patent: Jul. 11, 2017

(54) ENHANCED INSTRUMENT PROCEDURE VISUALIZATION

(71) Applicant: HONEYWELL INTERNATIONAL INC., Morris Plains, NJ (US)

(72) Inventors: Nathan Shaughn Turner, Phoenix, AZ (US); John-Paul Gorsky, Cave Creek, AZ (US); Vincent Acuna, Phoenix, AZ (US); Sue McCullough, Phoenix, AZ (US); Charles Dairman, Buckeye, AZ (US); Steven Crouch, Mesa, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/942,051

(22) Filed: Nov. 16, 2015

(65) Prior Publication Data
US 2017/0138759 A1   May 18, 2017

(51) Int. Cl.
  *G01C 23/00* (2006.01)
  *B64D 43/02* (2006.01)
  *G08G 5/00* (2006.01)

(52) U.S. Cl.
  CPC ............ *G01C 23/005* (2013.01); *B64D 43/02* (2013.01); *G08G 5/0047* (2013.01)

(58) Field of Classification Search
  CPC .................................................. G01C 23/005
  See application file for complete search history.

(56) References Cited

U.S. PATENT DOCUMENTS

| | | |
|---|---|---|
| 7,852,236 B2 | 12/2010 | Feyereisen et al. |
| 8,089,375 B1 | 1/2012 | Seah |
| 8,164,485 B2 | 4/2012 | Prinzel et al. |
| 8,754,786 B2 | 6/2014 | Burns et al. |
| 8,843,255 B2 | 9/2014 | Wilson et al. |
| 8,963,742 B1 | 2/2015 | Seah |
| 8,965,601 B1 | 2/2015 | Barber |
| 2010/0030405 A1 | 2/2010 | He et al. |
| 2010/0131126 A1* | 5/2010 | He ................... G01C 21/00 701/14 |
| 2011/0171611 A1 | 7/2011 | Batcheller et al. |

(Continued)

FOREIGN PATENT DOCUMENTS

EP   2490200 A2   8/2012

OTHER PUBLICATIONS

Schiefelle, Dr. J. et al.; Human Factors Flight Trial Analysis for 2D Situation Awareness and 3D Synthetic Vision Displays; 2003 IEEE.

(Continued)

*Primary Examiner* — Thomas Tarcza
*Assistant Examiner* — Michael Berns
(74) *Attorney, Agent, or Firm* — Lorenz & Kopf, LLP

(57) ABSTRACT

A system and method for providing the information contained in instrument procedure charts in a more intuitive and easier to comprehend manner is provided. The provided enhanced instrument procedure visualization system displays a dynamic three-dimensional view of a selected instrument procedure, and incorporates time-relevant information from weather and traffic sources. The provided enhanced instrument procedure visualization system further allows a pilot to scroll forward and backward in time to review and study the complete instrument procedure.

20 Claims, 9 Drawing Sheets

(56) References Cited

U.S. PATENT DOCUMENTS

2013/0027226 A1* 1/2013 Cabos .................. G08G 5/0013
340/961
2013/0261848 A1* 10/2013 Khatwa .................. G06Q 50/30
701/3
2014/0337796 A1 11/2014 Burgin et al.

OTHER PUBLICATIONS

Prinzel, L.J. et al.; Synthetic Vision Systems; Research and Technology Directorate, Crew Systems and Operations Branch (D-318), NASA Langley Research Center, Hampton, VA USA; 2008.
Extended EP Search Report for Application No. 16195190.0-1557 dated Oct. 4, 2017.

* cited by examiner

ENHANCED INSTRUMENT PROCEDURE VISUALIZATION

TECHNICAL FIELD

Embodiments of the subject matter described herein relate generally to instrument procedures. More particularly, embodiments of the subject matter described herein relate to a system and method that enhances instrument procedure visualization by dynamically displaying instrument procedures in three dimensions.

BACKGROUND

Although contemporary display systems for vehicles are providing more and more detail to an operator, opportunities to improve visualization of critical information remain. In particular, for aircraft, pilots typically obtain the information contained in an instrument procedure from paper flight charts or two dimensional electronic flight charts, which are often just scanned paper flight charts. In order to apply the two dimensional instrument procedure information to real-time flying scenarios, the pilot must synthesize and visualize aspects of the instrument procedure in a time-relevant manner.

Applying the two-dimensional instrument procedure information to real-time flying scenarios is complicated, in part because the information is compact and data-rich. Moreover, the pilot has to concurrently synthesize weather and traffic information provided by different sources (and typically presented on different display mediums) in order to completely comprehend and respond to the flying environment. Consequently, instrument procedures present a high cognitive workload for the pilot. The cognitive workload during instrument procedures may be reduced by presenting relevant information on a singular three-dimensional display system, and in a time-relevant (dynamic) manner. Presenting the information in three dimensions and in a time-relevant manner may also increase overall safety.

Accordingly, a system and method for providing the information contained in instrument procedure charts in a more intuitive and easier to comprehend manner is desirable. The desired enhanced instrument procedure visualization system renders a dynamic three-dimensional view of the selected instrument procedure, and additionally incorporates time-relevant information from weather and traffic sources. The desired enhanced instrument procedure visualization system further allows a pilot to scroll forward and backward in time to review and study the complete instrument procedure.

BRIEF SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

A method for displaying an instrument procedure on a three-dimensional display element, the method comprising; receiving a user selected destination and a user selected instrument procedure; receiving current position and current orientation information for a vehicle; processing the user selected destination, user selected instrument procedure, current position and current orientation to determine a vehicle path; and processing the vehicle path and the selected instrument procedure, to generate a three-dimensional map comprising a volume surrounding the vehicle path, wherein the volume comprises one or more features associated with the selected instrument procedure.

A display system for displaying an instrument procedure for a vehicle, the system comprising; a three-dimensional display element; a database comprising flight plan information, terrain information, frequency information, chart information, weather information, and airspace information; and a controller coupled to the three-dimensional display element, a source of a selected destination, a source of a selected instrument procedure, a source of a current position and a current orientation, and the database, and configured to: determine a vehicle path based on the selected destination, the selected instrument procedure, and the current position and the current orientation; and generate a three-dimensional map comprising a volume surrounding the vehicle path, wherein the volume comprises a feature associated with the selected instrument procedure.

A method for displaying an instrument procedure on a three-dimensional display element, the method comprising: receiving a user selected destination; receiving current position and orientation information for an aircraft; processing the user selected destination, current position and current orientation to determine a vehicle path; and processing the vehicle path to generate a three-dimensional map comprising a volume surrounding the vehicle path.

BRIEF DESCRIPTION OF THE DRAWINGS

A more complete understanding of the subject matter may be derived from the following detailed description taken in conjunction with the accompanying drawings, wherein, like reference numerals denote like elements, and.

DETAILED DESCRIPTION

Figure 1:
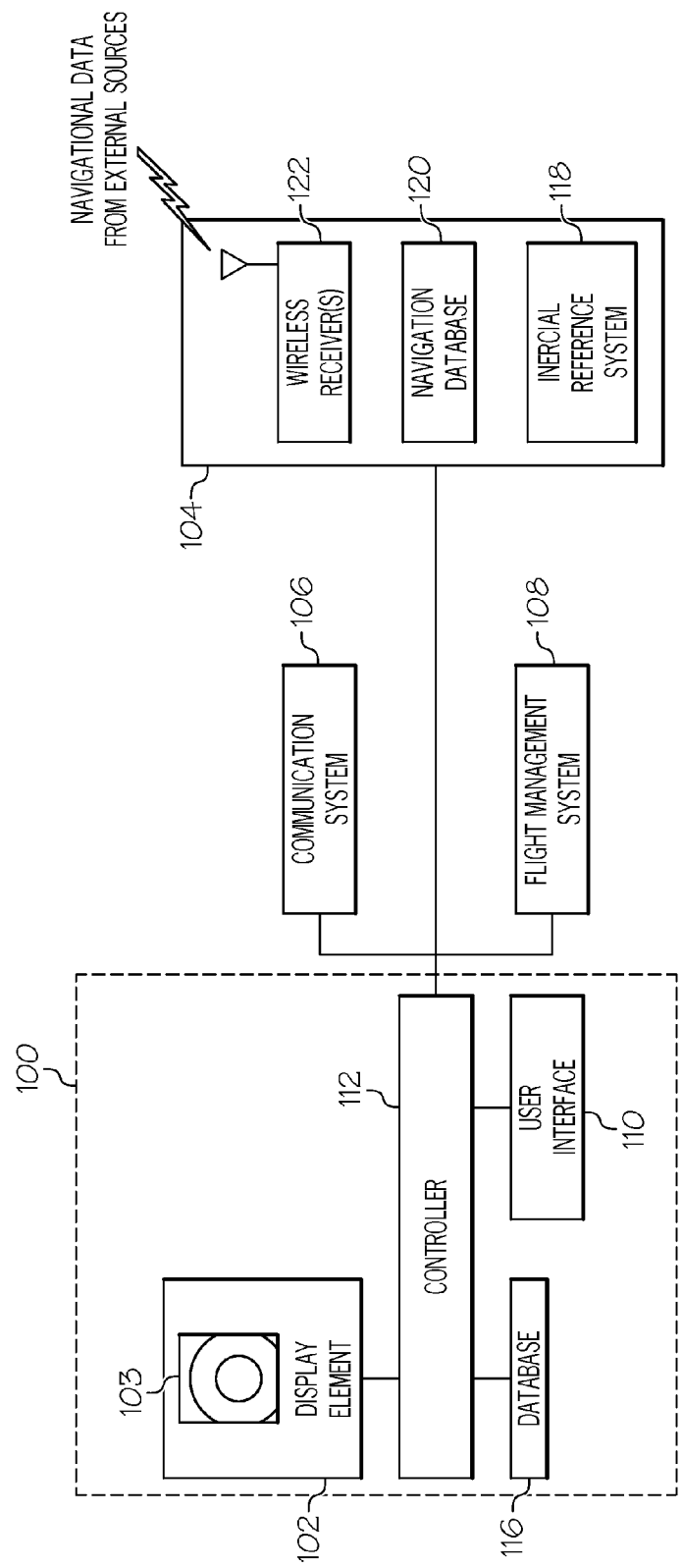
FIG. 1 is a block diagram of an enhanced instrument procedure visualization system suitable for use in an a vehicle in accordance with an embodiment.

The following detailed description is merely exemplary in nature and is not intended to limit the subject matter of the application and uses thereof. Furthermore, there is no intention to be bound by any theory presented in the preceding background or the following detailed description. Presented herein for purposes of explication is a certain exemplary embodiment of how a flight course (e.g. approach or departure course) may be graphically generated. For example, a graphical generation of an approach course will be discussed. However, it should be appreciated that this explicated example embodiment is merely an example and a guide for implementing the novel display system and method for graphically creating an approach/departure course. As such, the examples presented herein are intended as non-limiting.

Techniques and technologies may be described herein in terms of functional and/or logical block components and with reference to symbolic representations of operations, processing tasks, and functions that may be performed by various computing components or devices. It should be appreciated that any number of hardware, software, and/or firmware components configured to perform the specified functions may realize the various block components shown in the figures. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

For the sake of brevity, conventional techniques related to graphics and image processing, navigation, flight planning, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts discussed herein relate to aircraft display systems adapted for the dynamic display of three-dimensional images or maps. A three-dimensional volume representing the space surrounding a vehicle path is generated and dynamically rendered on the display element. This dynamic three-dimensional map renders features associated with a selected instrument procedure, allowing a user to visualize the flying environment and make quick and informed decisions. A three-dimensional map is implemented in a manner that improves situational awareness and reduces overall workload. By coordinating time sensitive information from a variety of sources, such as weather, traffic, and notice to airmen (NOTAM), the embodiments presented herein surpass mere flight simulation. In addition, by converting the various features from a two dimensional source (instrument procedure plate) to a three-dimensional presentation that is further synthesized with geographic, weather, and traffic information, the embodiments presented herein surpass traditional three-dimensional map presentations.

FIG. 1 depicts an enhanced instrument procedure visualization system 100, in accordance with an exemplary embodiment. The enhanced instrument procedure visualization system 100 includes, without limitation, a display element 102 for displaying a three-dimensional image 103, a controller 112, a user interface 110, and a database 116 suitably configured to support operation of the controller 112 and display element 102, as described in greater detail below. Although FIG. 1 shows a single display element 102, in practice, additional display elements may be present as independent units or onboard a host vehicle.

The controller 112 is configured to process inputs received and command display element 102 to display, render, or otherwise convey one or more graphical three-dimensional images 103. The three-dimensional image 103 may comprise a terrain and airspace map for which the controller 112 continuously processes received information and updates to remain temporally relevant (hence, occasionally referred to as a four dimensional map). Further, the three-dimensional map may be overlaid with two dimensional images, such as one or more text boxes to enhance user interaction, and/or a two dimensional image of a traditional instrument procedure chart. The content and presentation of the three-dimensional image 103 are responsive to user input via user interface 110. The controller 112 may also be configured to command display element 102 to render and/or display information pertaining to selected optional layers. Generation of the three-dimensional images 103 and examples thereof are presented in connection with FIGS. 2-8.

Three-dimensional image-generating devices suitable for use as display element 102 typically take the form of synthetic vision display systems, and various digital (e.g., liquid crystal, active matrix, plasma, etc.) display devices. In certain embodiments, display element 102 may be part of a tablet or hand-held device, or assume the form of a Head-Down Display (HDD) or a Head-Up Display (HUD) included within a rotorcraft's Electronic Flight Instrument System (EFIS).

Depending on the embodiment, the controller 112 may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. The controller 112 may also be implemented as a combination of computing devices, e.g., a combination of a digital signal processor and a microprocessor, a plurality of microprocessors, one or more microprocessors in conjunction with a digital signal processor core, or any other such configuration. Furthermore, the steps of a method or process described in connection with the embodiments disclosed herein may be embodied directly in hardware, in firmware, in a software module executed by the controller 112, or in any practical combination thereof.

In various embodiments, the user interface 110 may be realized as one or more of: a keypad, touchpad, keyboard, mouse, touchscreen, joystick, knob, microphone, gesture reader, or any other suitable device adapted to receive input from a user. In preferred embodiments, user interface 110 may be a touchscreen, cursor control device, joystick, or the like. In practice, the user may view a three-dimensional image 103 on the display element 102, and respond to the displayed information by providing user input by touching an area of the display element 102 that is touch sensitive, and/or by touching or otherwise entering user input on any other suitable user interface 110.

In operation, the controller 112 receives real-time navigational data and/or information regarding operation of the aircraft from the navigation system 104. Controller 112 communicates to and/or from the host aircraft via the communications system 106, as is appreciated in the art; and controller 112 may further receive real-time data and/or information regarding operation of the aircraft from any of the flight management system 108, the navigation system 104 and the communications system 106. The user interface 110 is coupled to the controller 112, and the user interface 110 and the controller 112 are cooperatively configured to process user to interaction with display element 102 and other elements of enhanced instrument procedure visualization system 100, as described herein.

Navigation systems 104 may include an inertial reference system 118, a navigation database 120 and one or more wireless receivers 122 for receiving navigational data from external sources in a well-known manner. Inertial reference system 118 and wireless receiver 122 provide controller 112 with navigational information derived from sources onboard and external to the host aircraft, respectively. More specifically, inertial reference system 118 provides controller 112 with information describing various flight parameters of the host vehicle or aircraft (e.g., position, orientation, velocity, etc.) as monitored by a number of motion sensors (e.g., accelerometers, gyroscopes, etc.) deployed onboard the vehicle. By comparison, wireless receiver 122 receives navigational information from various sources external to the aircraft. These sources may include various types of navigational aids (e.g., global position systems, non-directional radio beacons, very high frequency Omni-directional radio range devices (VORs), etc.), ground-based navigational facilities (e.g., Air Traffic Control Centers, Terminal Radar Approach Control Facilities, Flight Service Stations, and control towers), and ground-based guidance systems (e.g., instrument landing systems). In certain instances, wireless receiver 122 may also periodically receive traffic information from neighboring aircraft, for example, via Automatic Dependent Surveillance-Broadcast (ADS-B) systems. In a specific implementation, wireless receiver 122 assumes the form of a multi-mode receiver (MMR) having global navigational satellite system capabilities.

Navigation database 120 traditionally stores information required to construct flight plans and approach courses. For example, the navigation database 120 may contain information pertaining to the geographical location of reference points (e.g. waypoints) and line segments that connect the waypoints (e.g., legs) for various terminal area procedures. Such procedures may include runways, approaches, approach transitions, standard terminal arrival route (STAR), and STAR transitions, each to be discussed in detail below. The runway procedure will define the runways for an airport, while the approach procedure will define the flight path that should be followed for the selected runway. For example, Los Angeles International Airport (LAX) has multiple runways and various approaches for each runway. The approach transition procedure will further define the proper position of the aircraft for the selected approach and runway. The STAR and STAR transition procedure will further define the required flight course for the selected approach.

The navigation system 104 is configured to obtain one or more navigational parameters associated with operation of the aircraft. The navigation system 104 may be realized as a global positioning system (GPS), inertial reference system (IRS), or a radio-based navigation system (e.g., VHF Omni-directional radio range (VOR) or long range aid to navigation (LORAN)), and may include one or more navigational radios or other sensors suitably configured to support operation of the navigation system 104, as will be appreciated in the art. In an exemplary embodiment, the navigation system 104 is capable of obtaining and/or determining the instantaneous position of the aircraft, that is, the current location of the aircraft (e.g., the latitude and longitude) and the altitude or above ground level for the aircraft. The navigation system 104 may also obtain and/or determine the heading of the aircraft (i.e., the direction the aircraft is traveling in relative to some reference).

In an exemplary embodiment, the communications system 106 is suitably configured to support communications between the aircraft and another aircraft or ground location (e.g., air traffic control). In this regard, the communications system 106 may be realized using a radio communication system or another suitable data link system. In an exemplary embodiment, the flight management system 108 (or, alternatively, a flight management computer) is located onboard the aircraft. Although FIG. 1 is a simplified representation of enhanced instrument procedure visualization system 100, in practice, the flight management system 108 may be coupled to one or more additional modules or components as necessary to support navigation, flight planning, and other aircraft control functions in a conventional manner.

In an embodiment, features of the enhanced instrument procedure visualization system 100 are distributed throughout the host vehicle. In another embodiment, the enhanced instrument procedure visualization system 100 is configured to form a standalone independent unit, residing on a device such as a tablet, carry-on, or other hand-held device. In a standalone embodiment, database 116 may actually represent a plurality of databases that have been pre-loaded with information (described hereinabove) from, for example, the navigation system 104 communications system 106 and flight management system 108. In the standalone embodiment, database 116 may, therefore, comprise any of the following: a navigation database comprising flight plan information; a source of terrain information; a source of frequency information; a source of chart information; a source of weather information; and a source of airspace information.

FIGS. 2-8 are two dimensional snapshots of three-dimensional images that may be rendered on display element 102 at various points in time, in response to a user selected instrument procedure being displayed or "played" on the enhanced instrument procedure visualization system 100; it should be understood that images rendered on the display element 102 appear as dynamic, three-dimensional images, akin to watching or previewing a motion picture showing relevant features of a selected instrument procedure. The three-dimensional image comprises a volume surrounding a vehicle path. In an embodiment, the volume may comprise one or more predetermined distances in each direction around the vehicle, aligned with the vehicle path. In another embodiment, the volume may represent a predetermined amount of elapsed time around the vehicle and aligned with the vehicle path, at a predetermined traveling speed. Rendered within the volume is time-relevant and user selected features and information from multiple sources and databases 116.

An embodiment allows the user to "play" (where "play" refers to starting both the display of and control of the display of) an instrument procedure while watching it as a dynamic synthetic vision display, obtaining instrument procedure information (i.e., features of the instrument procedure) with time-relevance. The enhanced instrument procedure visualization system 100 supports stopping, starting, and moving forward and backward in time, responsive to user input. FIGS. 2-8 are provided to show features provided, as time elapses, in accordance with an exemplary embodiment. A person with skill in the art will readily recognize that a variety of other features, consistent with an amount of elapsed time, may be presented for a selected instrument procedure without departing from the scope of the invention presented herein. A slider bar (FIG. 2 202) allows a user to advance forward in time as well as going backward in time to review information relevant to a selected instrument procedure.

In the embodiments below, some overlays are described as being rendered in a visually distinguishable manner. Any one of a plurality of commonly known techniques may be employed to make an overlay visually distinguishable, non-limiting examples include: highlighting; changing color or opacity of text, backgrounds, or symbols; placing a border around something; changing font size or color; making a border, fill, or symbol shaded, hatched, dotted; etc.

Figure 2:
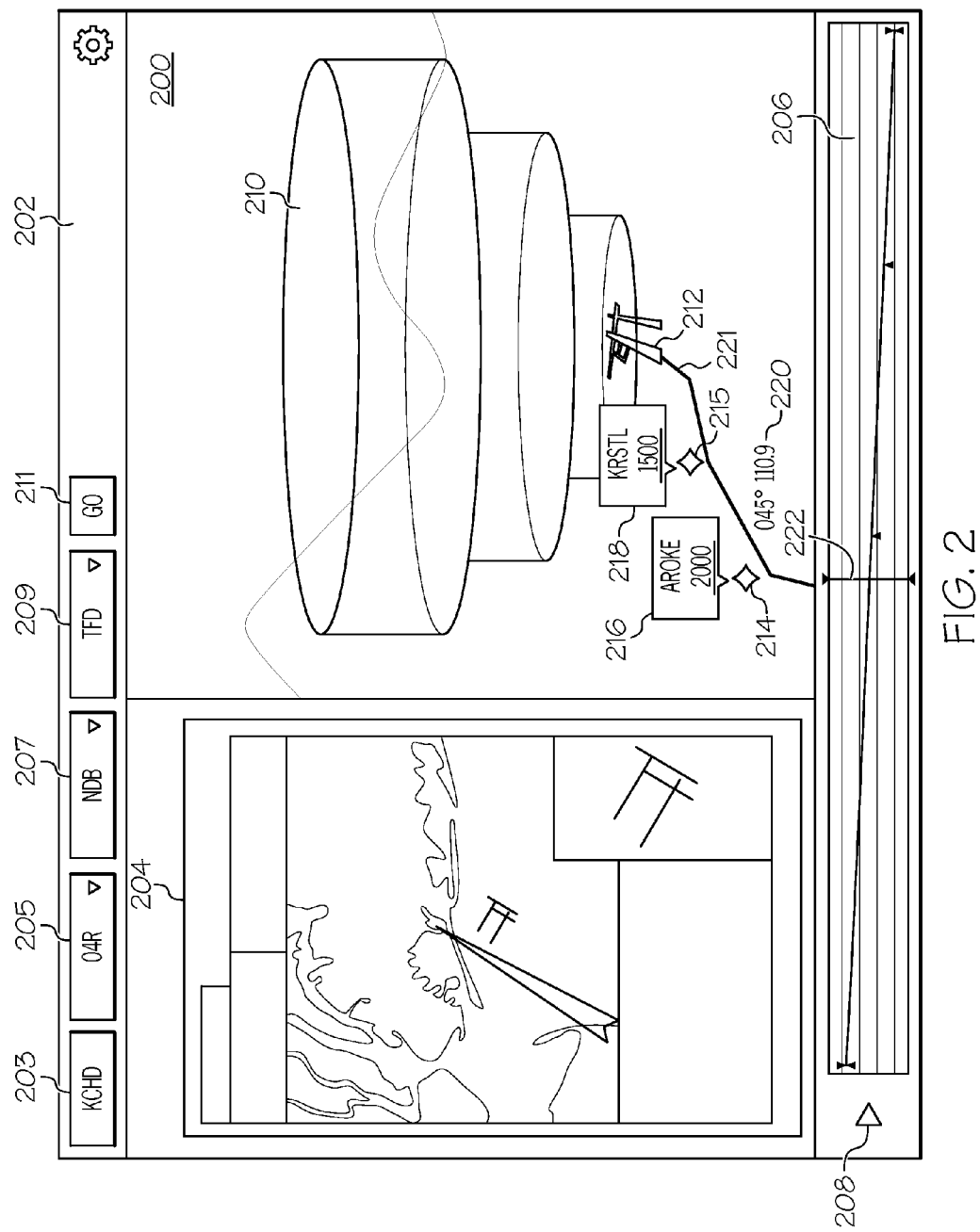
FIGS. 2-8 are three-dimensional images, in accordance with an exemplary embodiment.

FIG. 2 is a three-dimensional image 200, in accordance with an exemplary embodiment. Three-dimensional image 200 may be displayed on display element 102. A banner 202, having text boxes 203, 205, 207, 209, and 211, may be overlaid on three-dimensional image 200. A conventional procedure chart 204 may also be overlaid on three-dimensional image 200. As previously mentioned [instrument] procedure chart 204 provides information that pilots traditionally rely on to brief an instrument procedure before flying it. In addition, a vertical profile 206 may be overlaid on the three-dimensional image 200.

Within the banner 202, a "Go" button 211 allows the user to prompt the enhanced instrument procedure visualization system 100 to display the vehicle path, generally from an overhead perspective. User input may toggle back and forth between displaying (overlaying) and removing from the three-dimensional image 200 each of the banner 202 items, procedure chart 204, and vertical profile 206. A "play" button 208 may be rendered on a touch sensitive portion of the display element 102, to allow the user to start the enhanced instrument procedure visualization for a selected instrument procedure. A slider bar 222 allows the pilot to move back and forth in time within a selected instrument procedure, and, responsive to the position of the slider, controller 112 processes input and updates the three-dimensional image on the display element 102.

Along banner 202, text boxes may be overlaid or incorporated to provide useful information to the pilot while the pilot is watching a selected instrument procedure. In an exemplary embodiment, text boxes 203, 205, 207, 209, and 211 are used to indicate optional layers. Non-limiting examples of optional layers may include a waypoint list, frequencies information, traffic, weather, NOTAMs, AHRS, and a procedure chart (in two dimensions). In response to user selection of an optional layer, the system overlays one or more features from the user selected optional layer on the three-dimensional image 103, and removes therefrom any features associated with user de-selected optional layers.

The organization of the text boxes, and their content, may be modified according to user input. In an embodiment, a unique code for airport identification may be located in text box 203, a runway number chosen by the pilot in text box 205, an "approach type" (type of approach into the runway) in text box 207, and a navigational aid (NAVAID) leading into the start of the approach (known as the approach transition), in text box 209.

Three-dimensional image 200 comprises a plurality of features provided to communicate information to a pilot in an intuitive and readily comprehensible manner. A three-dimensional representation of the airspace 210 owned by the airport with the runway 212 is shown. Waypoint 214 and waypoint 215 are each shown with their name and respective altitude overlaid in a text bubble next to the waypoint. For each waypoint, the altitude provided may be an altitude that the pilot must fly at/at or above/or below. Important information such as bearing and frequency 220 for a corresponding navigational aid are overlaid in a convenient location near the flight path 221, so that the pilot may easily reference this information while watching the procedure.

Figure 3:
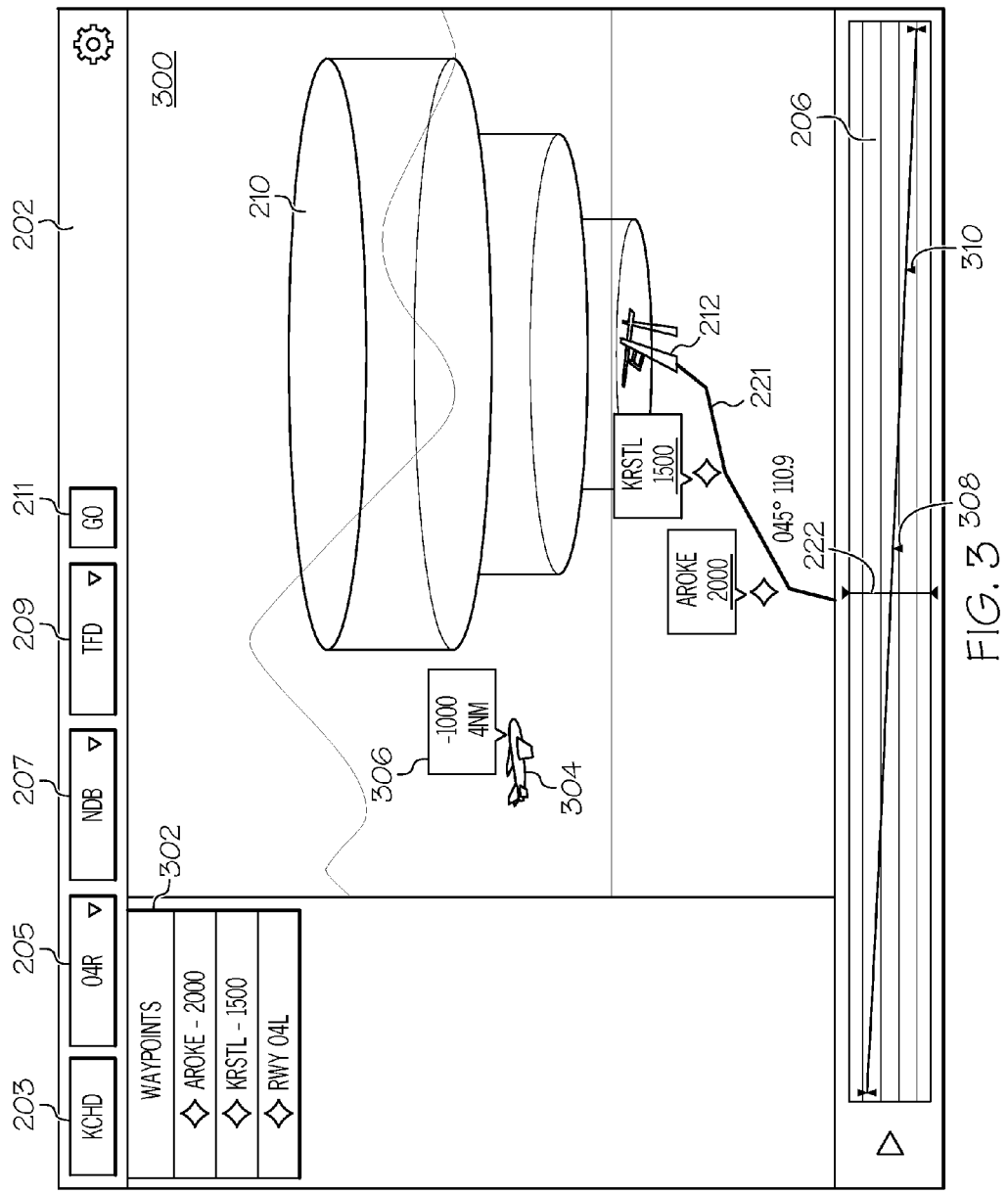

FIG. 3 is another three-dimensional image 300, in accordance with the exemplary embodiment. An optional waypoints list 302 has been overlaid on three-dimensional image 300, responsive to a user input selection of a waypoints optional layer. Traffic from Automatic Dependent Surveillance-Broadcast (ADS-B) and eventually 4-Dimensional Trajectory Based Operations (4D TBO) where aircraft are managed such that their current position is known along with trajectory such that future lateral position and altitude are predicted with high levels of certainty particularly in the terminal area during arrival, through approach and landing, may be displayed, for example, neighboring aircraft 304, with an associated text bubble 306. In an embodiment, text bubble 306 provides altitude in feet above the host aircraft, and distance in nautical miles away from the host aircraft. On the vertical profile 206, waypoints are also represented, for example, conventional symbols representing altitude constraints such as the symbol waypoint 308 and the symbol representing waypoint 310.

Figure 4:
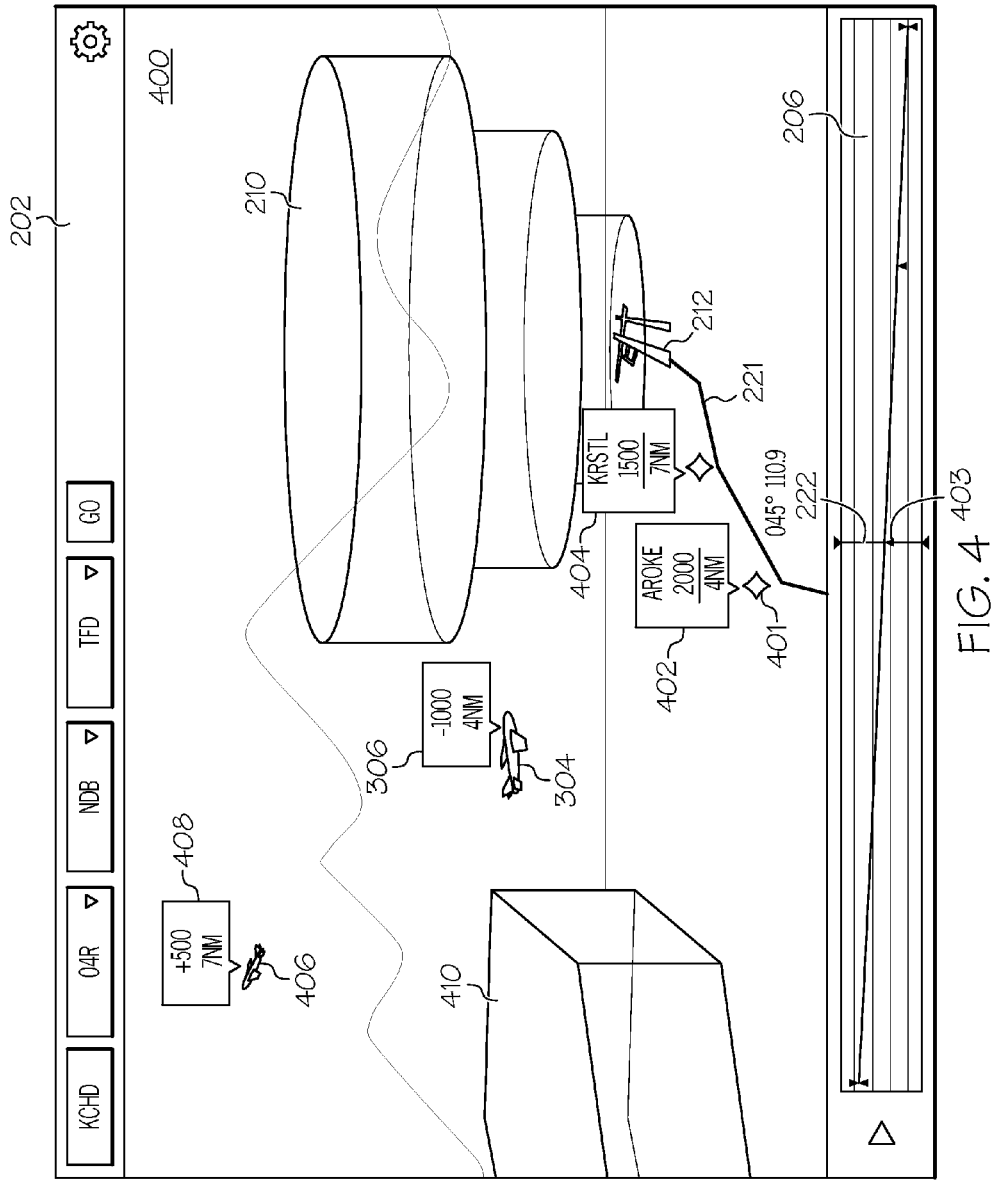

FIG. 4 is a three-dimensional image 400, in accordance with the exemplary embodiment, after some flying time has elapsed. As the instrument procedure progresses, additional neighboring traffic predicted locations 406 (with associated text bubble 408) is shown, and the enhanced instrument procedure visualization system 100 may render the next waypoint (waypoint 401 and the associated text bubble 402) in a visually distinguishable manner. The next waypoint may also be rendered in a visually distinguishable manner on the vertical profile (waypoint 403).

In FIG. 4 the pilot is alerted to hazardous/severe predicted weather. The hazardous/severe predicted weather region may be a three-dimensional volume, and may be displayed or overlaid on the three-dimensional image 400 in a visually distinguishable manner. In FIG. 4, region 410 is an alert to hazardous/severe predicted weather. A pilot may select the region 410 (using any suitable user input technique and user input interface 110), and in response, the enhanced instrument procedure visualization system 100 will overlay a text bubble proximate to region 410 (FIG. 5 text bubble 502) that provides detailed textual information associated with the hazardous/severe predicted weather. The display of the hazardous/severe predicted weather region 410 allows the pilot to watch and/or monitor weather events that are nearby the flight path 221.

Figure 5:
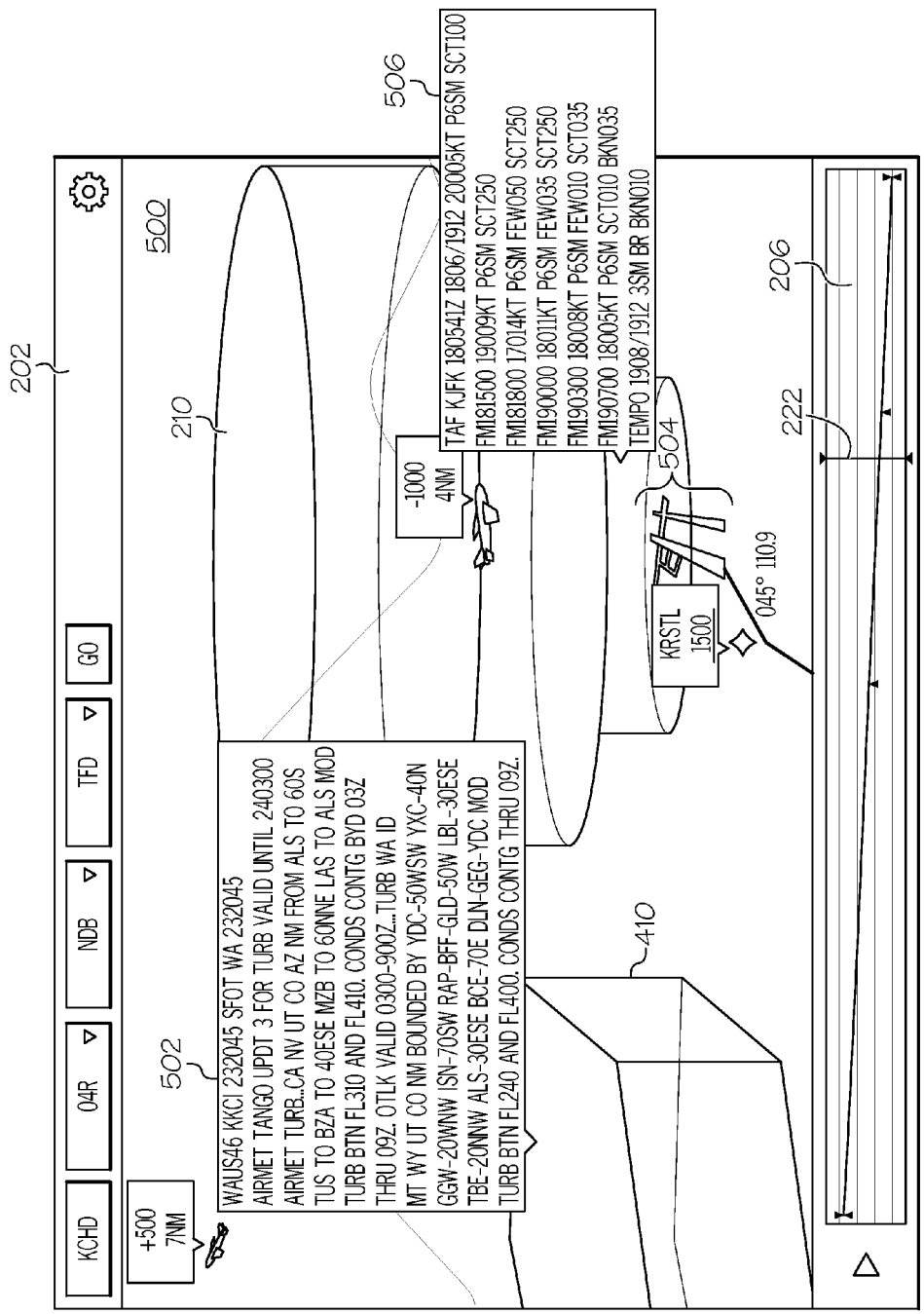

FIG. 5 is a three-dimensional image 500, in accordance with the exemplary embodiment, after more elapsed flying time from FIG. 4. Comparing FIG. 4 to FIG. 5, one may observe that more time has elapsed in the instrument procedure (for example, the host aircraft has passed waypoint AROKE, and the slider bar 222 is further to the right). Text bubble 502 displays detailed information associated with the hazardous/severe predicted weather region 410. In response to the user selecting the airport 504, the enhanced instrument procedure visualization system 100 may display a text box 506, which provides a detailed textual forecast for the airport at the predicted time of landing.

Figure 6:
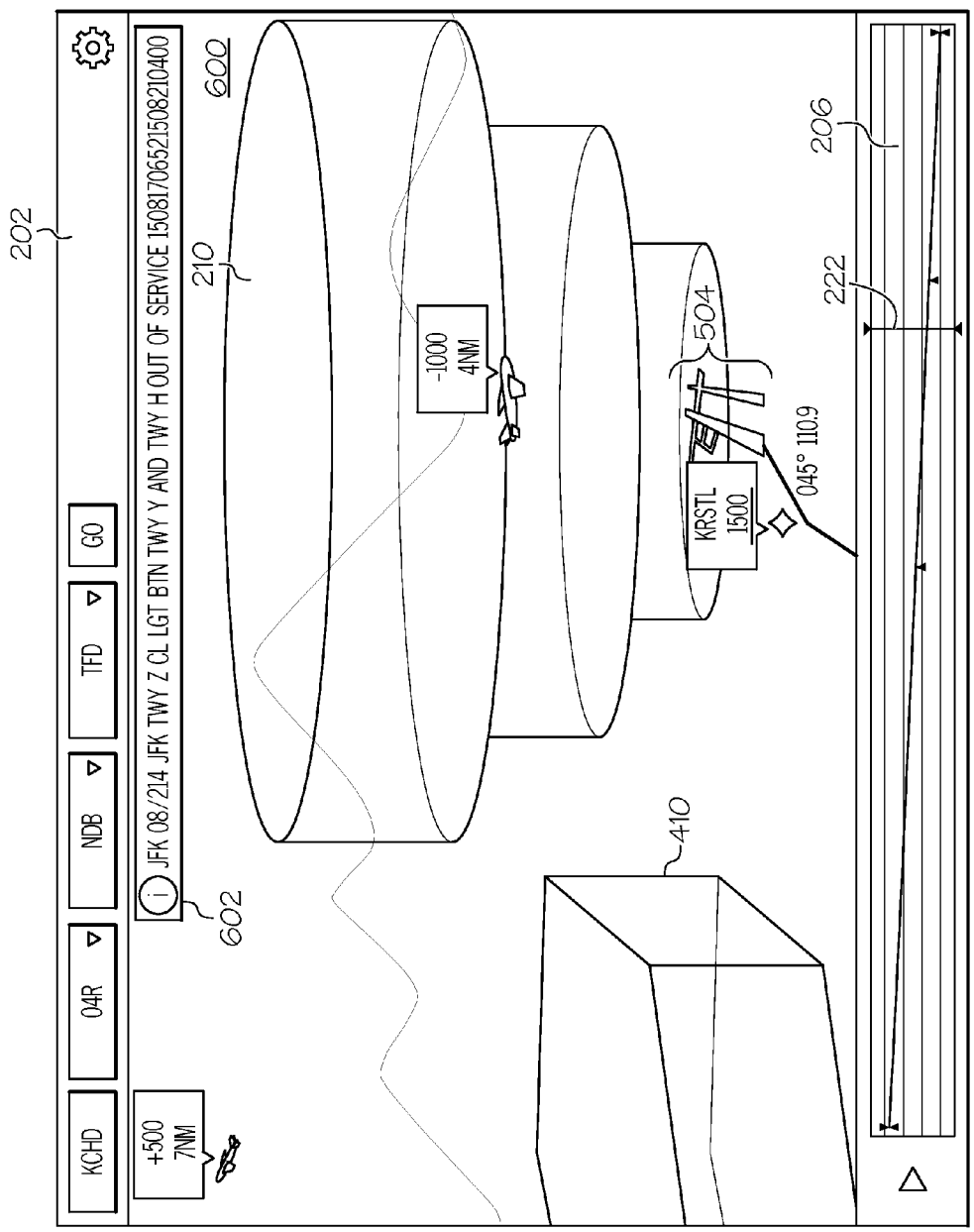

FIG. 6 is a three-dimensional image 600, in accordance with the exemplary embodiment, showing the display of additional time-relevant information. At any point along the "play" of the selected instrument procedure, the enhanced instrument procedure visualization system 100 may also overlay three-dimensional image 600 with time-relevant Notices to Airman (NOTAM) 602.

Figure 7:
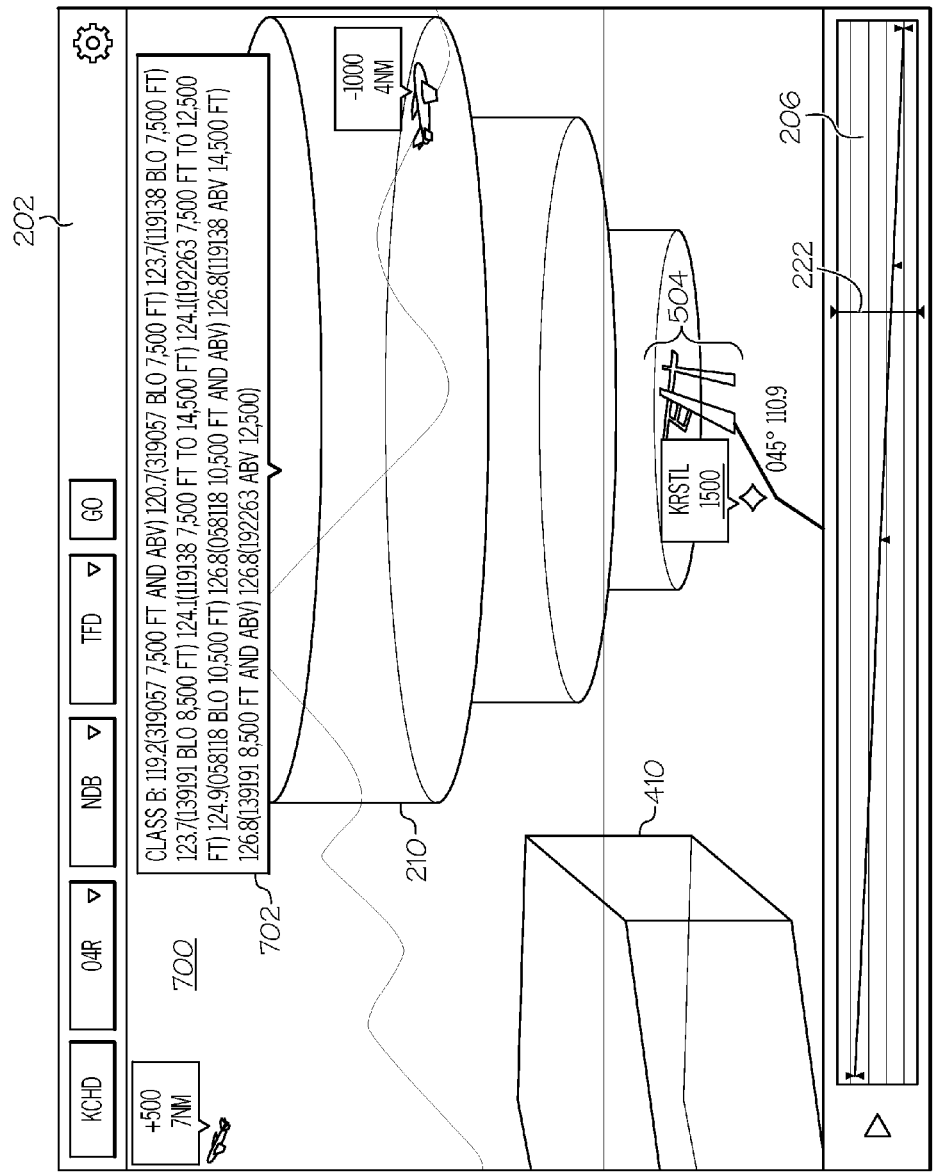

FIG. 7 is another three-dimensional image 700, in accordance with the exemplary embodiment, showing more time-relevant information. At any point along the "play" of the selected instrument procedure, the enhanced instrument procedure visualization system 100 may also overlay three-dimensional image 600 with communication frequencies 702 for the approaching airspace.

Figure 8:
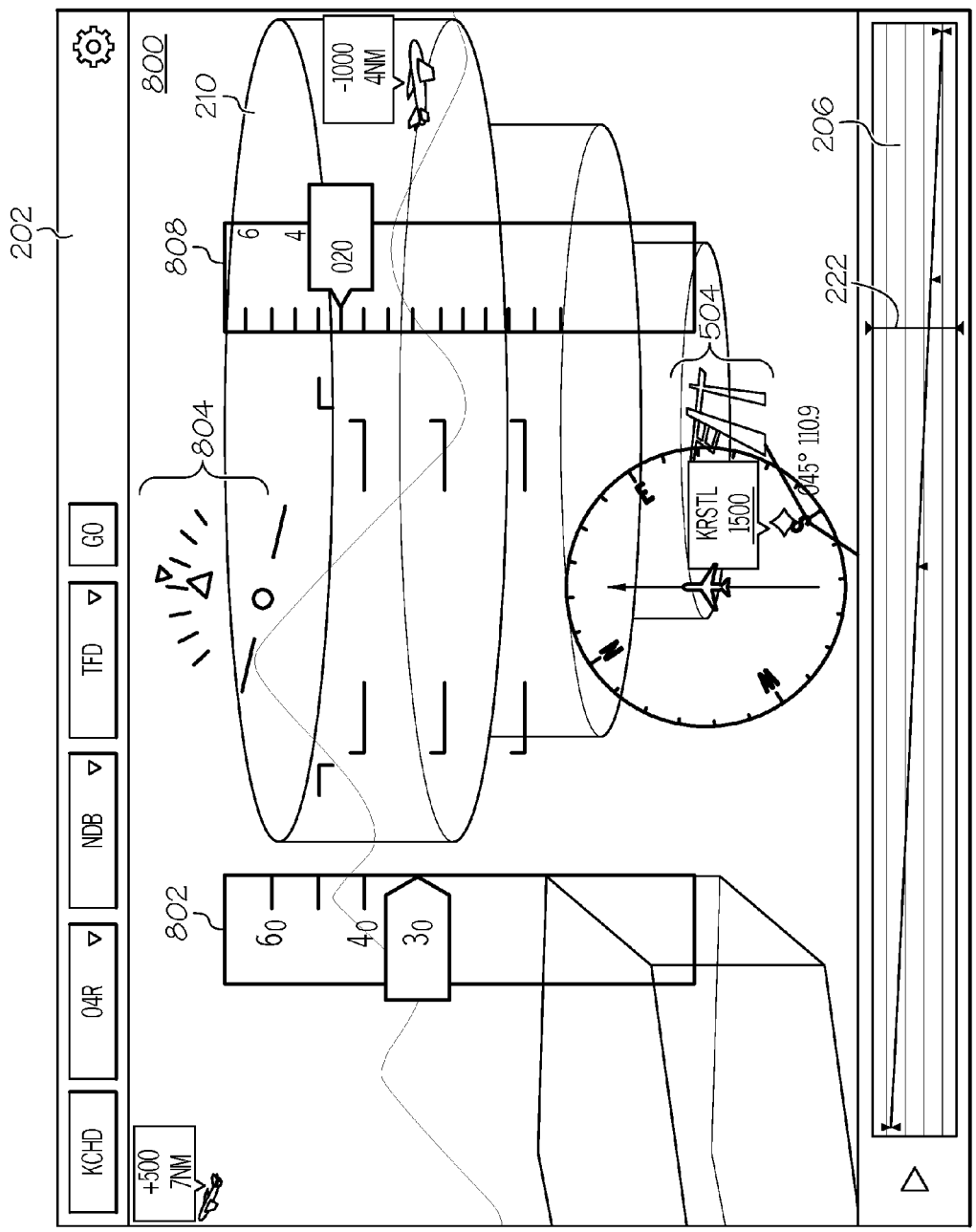

FIG. 8 is yet another three-dimensional image 800, in accordance with the exemplary embodiment. At any point along the "play" of the selected instrument procedure, in response to user input, the enhanced instrument procedure visualization system 100 may overlay three-dimensional image 600 with one or more from the set including: airspeed indications 802, attitude information 804 on pitch and bank of the host aircraft, heading and navigation information 806, and altitude information 808. A person with skill in the art will readily recognize that the information content, form factor, and location on the three-dimensional image 800 of airspeed indications 802, attitude information 804 on pitch and bank of the host aircraft, heading and navigation information 806, and altitude information 808 are consistent with a contemporary presentation of the information.

Figure 9:
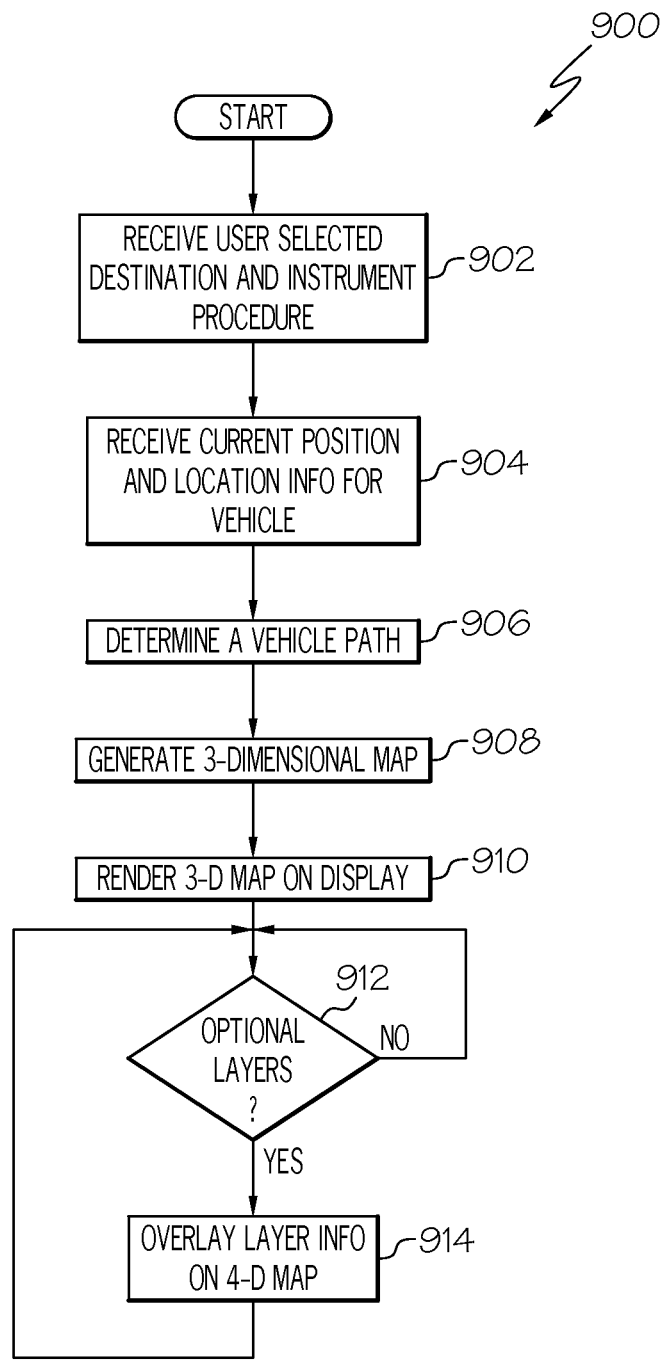
FIG. 9 is a process for enhanced instrument procedure visualization, in accordance with the exemplary embodiment.

FIG. 9 is a process 900 for enhanced instrument procedure visualization, in accordance with the exemplary embodiment. It is readily appreciated that process 900 may have additional steps, the steps may be arranged in a different order, and steps may be consolidated. At STEP 902 a selected destination and a selected instrument procedure is received. The selected destination and the selected instrument procedure, including a flight path, may be sourced from a user selection or from an external system. At STEP 904 information comprising a current position and a current orientation of a host vehicle is received. Wherein the host vehicle is an aircraft, receiving a selected destination is receiving an airport, and receiving current position and current orientation for a vehicle comprises receiving respective aircraft direction, aircraft attitude, aircraft speed, and aircraft altitude, from one or more respective databases 116 in a hand-held unit, or from the respective aircraft systems and sources. The controller 112 processes current position information, current orientation information, the selected destination, and the selected instrument procedure to determine a vehicle path in STEP 906. At STEP 908, the process 900 generates a three-dimensional map surrounding the vehicle path based on information from at least one from the set including a navigation database, terrain/elevation database, frequency database, airport/airspace database, chart database, and weather database. At STEP 910, the vehicle path and the three-dimensional map are rendered on the synthetic vision display element 102.

At STEP 912, a user selected optional layer may be received. The optional layers include, but are not limited to, a waypoint list, frequencies information, traffic, weather, NOTAMs, AHRS, and a procedure chart (in two dimensions). At STEP 914, the system overlays one or more features associated with the user selected optional layer, and removes any features associated with de-selected optional layers. In practice, STEPS 912-914 may appear as follows: a user selects a first optional layer, the process receives the first user selected optional layer and renders one or more features associated with the first selected optional layer, followed by the process receiving a deselection of the first optional layer and receiving a second user selected optional layer. Accordingly, one or more features associated with the second optional layer are rendered on the three-dimensional image and features associated with the deselected first optional layer are removed from the three-dimensional image.

The embodiments described herein provide a system and method for enhanced instrument procedure visualization. In addition to providing instrument procedure information in an intuitive, readily comprehensible, three-dimensional synthetic vision display, embodiments incorporate relevant information from weather and traffic sources, and allow the user to move a slider bar 222 to effect scrolling the selected instrument procedure forward and/or backward in time. In response to scrolling the instrument procedure forward or backward in time, the controller 112 processes inputs and updates the three-dimensional image on the display element 102 to represent features of the selected instrument procedure at a time associated with the time placement of the slider bar 222. Embodiments also respond to user input requesting the display of information corresponding to one or more optional information layers, and features associated with selected optional information layers are displayed without hiding a substantial portion of the three-dimensional map on the synthetic vision display. The aforementioned features reduce cognitive workload and increase safety.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for displaying an instrument procedure on a three-dimensional display element, the method comprising;
at a controller,
receiving a user selected destination and a user selected instrument procedure;
receiving current position and current orientation information for a vehicle;
processing the user selected destination, user selected instrument procedure, current position and current orientation to determine a vehicle path;
processing the vehicle path and the selected instrument procedure, to generate a three-dimensional map comprising the vehicle path and a volume surrounding the vehicle path, wherein the volume (i) is selected from among the set including (a) a predetermined amount of elapsed time around the vehicle at a predetermined traveling speed, and (b) predetermined distances around the vehicle, and (ii) comprises one or more features associated with the selected instrument procedure; and
commanding the three-dimensional display element to dynamically render the three-dimensional map as a three-dimensional dynamic synthetic vision image.

2. The method of claim 1, wherein the vehicle is an aircraft, the vehicle path is a flight path, the selected destination is an airport, and the step of receiving current position and orientation for a vehicle comprises receiving respective aircraft direction, aircraft attitude, aircraft speed, and aircraft altitude.

3. The method of claim 2, wherein the three-dimensional display element comprises a synthetic vision display element.

4. The method of claim 2, further comprising:
overlaying, on the three-dimensional dynamic synthetic vision image, a banner with text boxes providing optional layers;
receiving a first user selected optional layer; and rendering, on the three-dimensional map, a feature associated with the first user selected optional layer, responsive to the user selection.

5. The method of claim 4, further comprising:
receiving a second user selected optional layer;
rendering, on the three-dimensional map, a feature associated with the second user selected optional layer; and
removing, from the three-dimensional map, the feature associated with the first user selected optional layer in response to receiving a user de-selection of the first user selected optional layer.

6. The method of claim 4, wherein the optional layers are selected from among the set including waypoint list, frequencies, traffic, weather, notice to airmen (NOTAMs), attitude and heading reference system (AHRS), and procedure chart.

7. A display system for displaying an instrument procedure for a vehicle, the system comprising:
a three-dimensional display element;
a database comprising flight plan information, terrain information, frequency information, chart information, weather information, and airspace information; and
a controller coupled to the three-dimensional display element, a source of a selected destination, a source of a selected instrument procedure, a source of a current position and a current orientation, and the database, and configured to:
determine a vehicle path based on the selected destination, the selected instrument procedure, and the current position and the current orientation; and
generate a dynamic three-dimensional map comprising a volume surrounding the vehicle path, wherein the volume (i) comprises a feature associated with the selected instrument procedure, and (ii) moves forward or backward in time responsive to user input;
command the three-dimensional display element to dynamically render the three-dimensional map as a synthetic vision image.

8. The system of claim 7, wherein the vehicle is an aircraft, the vehicle path is a flight path, the selected destination is an airport, and the controller is further configured to receive aircraft direction, aircraft attitude, aircraft speed, and aircraft altitude.

9. The system of claim 8, wherein the three-dimensional display element comprises a synthetic vision display element.

10. The system of claim 8, wherein the controller is further configured to:
command the three-dimensional display element to display a banner with text boxes providing optional layers;
receive a first user selected optional layer; and
render on the three-dimensional map, a feature associated with the first user selected optional layer.

11. The system of claim 10, wherein the controller is further configured to:
receive a second user selected optional layer; and
render, on the three-dimensional map, a feature associated with the second user selected optional layer.

12. The system of claim 11, wherein the optional layers are selected from among the set including waypoint list, frequencies, traffic, weather, notice to airmen (NOTAMs), attitude and heading reference system (AHRS), and procedure chart.

13. A method for displaying aircraft information on a three-dimensional synthetic vision display element, the method comprising:
at a controller,
receiving an instrument procedure;
receiving a selected destination;
receiving a current position and a current orientation for an aircraft;
processing the user selected destination, the current position and the current orientation to determine a vehicle path; and
processing the vehicle path and the instrument procedure to generate (i) three-dimensional map comprising the vehicle path and a volume surrounding the vehicle path, and (ii) a plurality of text boxes indicating optional layers for display; and
dynamically rendering, on the three-dimensional synthetic vision display element, the three-dimensional map and the plurality of text boxes.

14. The method of claim 13, further comprising:
rendering a feature associated with the selected instrument procedure within the three-dimensional map.

15. The method of claim 14, wherein the vehicle is an aircraft, the vehicle path is a flight path, the selected destination is an airport, and the step of receiving current position and current orientation for a vehicle comprises receiving respective aircraft direction, aircraft attitude, aircraft speed, and aircraft altitude.

16. The method of claim 15, further comprising:
receiving a first user selected optional layer; and
rendering, on the three-dimensional map, a feature associated with the first user selected optional layer.

17. The method of claim 16, further comprising:
receiving a second user selected optional layer; and
rendering, on the three-dimensional map, a feature associated with the second user selected optional layer.

18. The method of claim 17, further comprising removing, from the three-dimensional map, the feature associated with the first user selected optional layer in response to receiving a user de-selection of the first user selected optional layer.

19. The method of claim 18, wherein the optional layers are selected from among the set including waypoint list, frequencies, traffic, weather, notice to airmen (NOTAMs), attitude and heading reference system (AHRS), and procedure chart.

20. The method of claim 13, further comprising, dynamically moving the three-dimensional map forward or backward in time responsive to user input.

* * * * *